June 28, 1927.

C. C. DAVIS ET AL 1,633,697

CUSHIONING MEANS FOR TILTABLE AUTOMOBILE SEATS

Filed June 3, 1926

WITNESSES

INVENTORS
C. C. Davis
G. I. Clarke,
BY
ATTORNEYS

Patented June 28, 1927.

1,633,697

UNITED STATES PATENT OFFICE.

CECIL C. DAVIS AND GEORGE I. CLARKE, OF WEST PALM BEACH, FLORIDA.

CUSHIONING MEANS FOR TILTABLE AUTOMOBILE SEATS.

Application filed June 3, 1926. Serial No. 113,518.

This invention relates to a cushioning device for seats of automobiles and has for its object the provision of a device adapted to support the rear end of the well known "jump" seat of the coach type of automobile to provide easier riding qualities and freedom from road jars.

A further object of the invention is the provision of a compact unitary structure which may be applied beneath the free end of the tiltable seat located at the front part of the body of an automobile of the coach type, and in which the cushion may be removed or replaced at will.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figure 1:
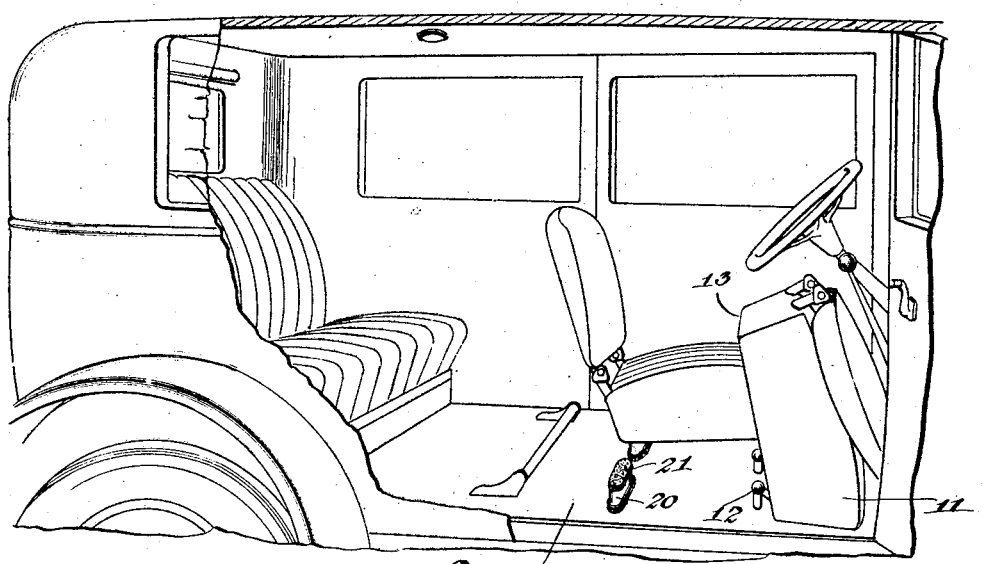
Figure 1 is a view in perspective of an automobile with parts broken away showing the application of our invention thereto.
Figure 2:
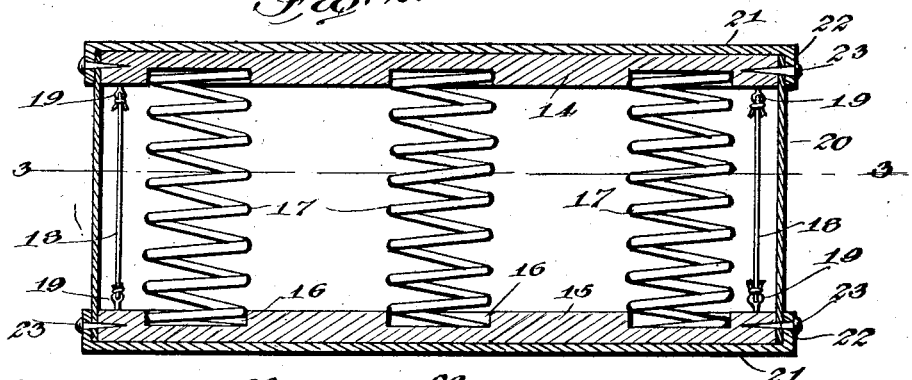
Figure 2 is a longitudinal vertical section of our cushioning device.

Referring more particularly to the drawings, 10 designates the floor of an automobile on which is pivotally mounted a tiltable seat 11 as shown at 12. The free end 13 of the seat is adapted to be moved towards the floor 10 and either rest thereupon or have some means for supporting the same above the floor.

In order to support the rear end of the seat a cushioning means is provided which will not only aid in supporting the free end of the seat in spaced relation with the floor but which will provide for easier riding and more comfort to passengers. This device consists of a pair of spaced boards 14 and 15 which are provided with sockets 16 to receive the opposite ends of coil springs 17.

Figure 3:
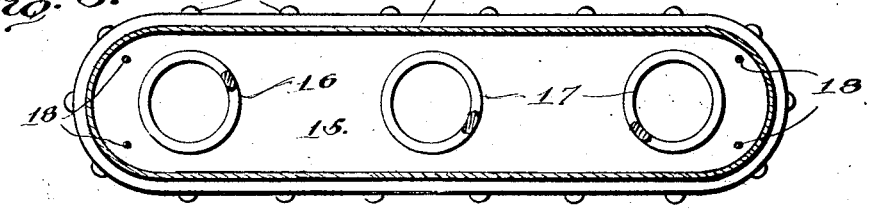
Figure 3 is a horizontal section of the same.

It will be appreciated that the coil springs may be secured in any approved manner directly to the inner faces of the boards 14 and 15. These boards are held in spaced relation and by means of cords or cables 18 which have their ends connected to eyes 19 secured to the inner faces of the boards 14 and 15. It will be noted from an inspection of Figure 3 that four of these cables are employed for the purpose of not only maintaining the boards in spaced relation but for placing the springs 17 under a predetermined tension.

A covering 20 of valour or any suitable cover embraces the side and end edges of the blocks 14 and 15 and is secured to the same to form a closure for the open spaces at the sides and ends of the cushions. The top and bottom boards 14 and 15 respectively are provided with a covering 21 which may be of leather or any composition suitable for the purpose. The edges 22 of the covering 21 are turned upwardly to a height which is equal to the width of the boards 14 and 15 and by means of tacks 23 are secured to the side and end edges of the boards, the tacks also being employed to secure the lower covering 20 to said boards since the inturned portions 22 of the covering 21 are placed in overlapping relation with the edges of the member 20.

The completed article may be made in different sizes with heavier or lighter springs as may be required and the same is placed in the position shown in Figure 1 at a point where the rear free ends 13 of the tiltable seats 11 will rest upon the cushions and thereby aid in providing for easier riding in the automobile.

What we claim is:

1. A cushioning means for tiltable automobile seats comprising a pair of spaced rigid members, a resilient means between the spaced members, means for maintaining the resilient means under a predetermined tension and for retaining the rigid members in spaced relation, a covering secured to the end and side edges of the rigid members and forming a closure to house the resilient means.

2. A cushioning means for tiltable automobile seats comprising a pair of spaced rigid members, a resilient means between the spaced members, means for maintaining the resilient means under a predetermined tension and for retaining the rigid members in spaced relation, a covering secured to the end and side edges of the rigid members and forming a closure to house the resilient means, a covering for the rigid members having its ends extended inwardly and embracing the edges of the covering which forms the housing.

CECIL C. DAVIS.
GEORGE I. CLARKE.